(12) United States Patent
Sun et al.

(10) Patent No.: US 12,104,398 B2
(45) Date of Patent: Oct. 1, 2024

(54) LEG TUBE SLIDING LOCKING MECHANISM FOR OPENING AND CLOSING FOLDING TENT

(71) Applicant: ZHEJIANG YOTRIO GROUP CO., LTD, Zhejiang (CN)

(72) Inventors: Linyong Sun, Zhejiang (CN); Jianqiang Xie, Zhejiang (CN)

(73) Assignee: ZHEJIANG YOTRIO GROUP CO., LTD, Zhejiang (CN)

( * ) Notice: Subject to any disclaimer, the term of this patent is extended or adjusted under 35 U.S.C. 154(b) by 225 days.

(21) Appl. No.: 17/913,146

(22) PCT Filed: Sep. 23, 2020

(86) PCT No.: PCT/CN2020/117015
§ 371 (c)(1),
(2) Date: Nov. 24, 2022

(87) PCT Pub. No.: WO2021/184715
PCT Pub. Date: Sep. 23, 2021

(65) Prior Publication Data
US 2023/0146722 A1 May 11, 2023

(30) Foreign Application Priority Data
Mar. 20, 2020 (CN) .......................... 202020361497.0

(51) Int. Cl.
*E04H 15/60* (2006.01)
*E04H 15/46* (2006.01)
(Continued)

(52) U.S. Cl.
CPC ............. *E04H 15/60* (2013.01); *E04H 15/46* (2013.01); *E04H 15/50* (2013.01); *F16B 7/105* (2013.01); *Y10T 403/32483* (2015.01)

(58) Field of Classification Search
CPC ......... E04H 15/60; E04H 15/46; E04H 15/50; F16B 7/105; F16B 7/14; F16B 2/248; Y10T 403/32483
(Continued)

(56) References Cited

U.S. PATENT DOCUMENTS

| | | | | |
|---|---|---|---|---|
| 6,951,327 B1 * | 10/2005 | Seo | ........................ | F16B 7/0446 248/188 |
| 7,066,676 B2 * | 6/2006 | Tsai | ........................ | F16B 7/042 403/379.2 |

(Continued)

FOREIGN PATENT DOCUMENTS

| | | |
|---|---|---|
| CN | 2336638 | 9/1999 |
| CN | 2697218 | 5/2005 |

(Continued)

OTHER PUBLICATIONS

"International Search Report (Form PCT/ISA/210) of PCT/CN2020/117015", mailed on Dec. 23, 2020, with English translation thereof, pp. 1-4.

(Continued)

*Primary Examiner* — Robert Canfield
(74) *Attorney, Agent, or Firm* — JCIPRNET

(57) ABSTRACT

A leg tube sliding locking mechanism for opening and closing a folding tent includes a sliding support sleeved on a leg tube, a jump bead, and a V-shaped spring. One end of the V-shaped spring is connected to the jump bead, and the other end of the V-shaped spring is fixed to an inner wall of the leg tube. A bushing is installed on an inner wall of the sliding support in a fitted manner.

An upper end of the busing extends downward to form a pressing sheet, and the pressing sheet has a lower end extending outwards to a lower end of the sliding support. The pressing sheet covers the jump bead.

7 Claims, 4 Drawing Sheets

(51) Int. Cl.
 *E04H 15/50* (2006.01)
 *F16B 7/10* (2006.01)
(58) Field of Classification Search
 USPC .................................. 135/25.4, 75, 114, 145
 See application file for complete search history.

(56) References Cited

U.S. PATENT DOCUMENTS

| | | | | |
|---|---|---|---|---|
| 7,395,830 | B2* | 7/2008 | Seo | E04H 15/46 |
| | | | | 403/324 |
| 7,849,867 | B2* | 12/2010 | Takayama | E04H 15/60 |
| | | | | 135/114 |
| 11,357,334 | B2* | 6/2022 | Choi | A47C 19/024 |
| 2007/0012346 | A1* | 1/2007 | Choi | F16B 7/105 |
| | | | | 135/120.3 |
| 2015/0107637 | A1* | 4/2015 | Lamke | E04H 15/50 |
| | | | | 135/120.1 |
| 2019/0292808 | A1* | 9/2019 | Dotterweich | E04H 15/02 |

FOREIGN PATENT DOCUMENTS

| | | |
|---|---|---|
| CN | 203223047 | 10/2013 |
| CN | 203570775 | 4/2014 |
| CN | 206616933 | 11/2017 |

OTHER PUBLICATIONS

"Written Opinion of the International Searching Authority (Form PCT/ISA/237) of PCT/CN2020/117015", mailed on Dec. 23, 2020, pp. 1-3.

\* cited by examiner

LEG TUBE SLIDING LOCKING MECHANISM FOR OPENING AND CLOSING FOLDING TENT

CROSS-REFERENCE TO RELATED APPLICATION

This application is a 371 of international application of PCT application serial no. PCT/CN2020/117015 filed on Sep. 23, 2020 which claims the priority benefit of China application no. 202020361497.0 filed on Mar. 20, 2020. The entirety of each of the above mentioned patent applications is hereby incorporated by reference herein and made a part of this specification.

BACKGROUND

Technical Field

The invention belongs to the technical field of folding tents, and specifically relates to a leg tube sliding locking mechanism for opening and closing a folding tent.

Description of Related Art

A folding tent is unfolded when used and folded and contracted when not used and has the advantages of sunshade, rain shielding and convenience in carrying, so that said tent is widely used in daily life. However, during folding and contraction of the existing folding tent, it is required to press a jump bead arranged on a leg tube of the folding tent for unlocking, since the hand of an operator make direct contact with the jump bead, the hand clamping phenomenon occurs easily, and certain injuries may be caused to the operator due to the excessively large folding force. In addition, the psychological shadow may be left for the operator in case of the hand clamping condition, resulting in scrupulousness or fear of pressing during pressing of the jump bead later and inconvenience in use.

SUMMARY

In view of the problems in the prior art, the purpose of the present invention design is to provide a leg tube sliding locking mechanism for opening and closing a folding tent.

The invention is implemented through the following technical solutions.

A leg tube sliding locking mechanism for opening and closing the folding tent is provided, and the leg tube sliding locking mechanism includes a sliding support sleeved on a leg tube, a jump bead and a V-shaped spring, one end of the V-shaped spring is connected to the jump bead, the other end of the V-shaped spring is fixed to an inner wall of the leg tube, a bushing is installed on an inner wall of the sliding support in a fitted manner, an upper end of the bushing extends downwards to form a pressing sheet, the pressing sheet has a lower end extending outwards to a lower end of the sliding support, and the pressing sheet covers the jump bead.

In an embodiment, the bushing is correspondingly provided with a notch parallel to the pressing sheet.

In an embodiment, the upper end of the bushing is provided with an upper edge, and the upper edge has a lower end abutting against an upper end of the sliding support.

In an embodiment, the jump bead is provided with an installing hole, and one end of the V-shaped spring is inserted in the installing hole.

In an embodiment, a cross section of the V-shaped spring is round.

In an embodiment, the jump bead and the V-shaped spring are integrally arranged.

In an embodiment, a spring body of the V-shaped spring is of a plate-shaped structure.

The sliding support is internally provided with the bushing in a fitted manner such that the jump bead is not required to be directly pressed when the folding tent is folded and contracted, easy contraction is realized by pressing the pressing sheet having the large area, and the structure is easy to transform and realize.

DESCRIPTION OF THE EMBODIMENTS

The present invention is further described in detail below with reference to the accompanying drawings of the specification, and specific embodiments are provided.

Embodiment 1

Figure 1:
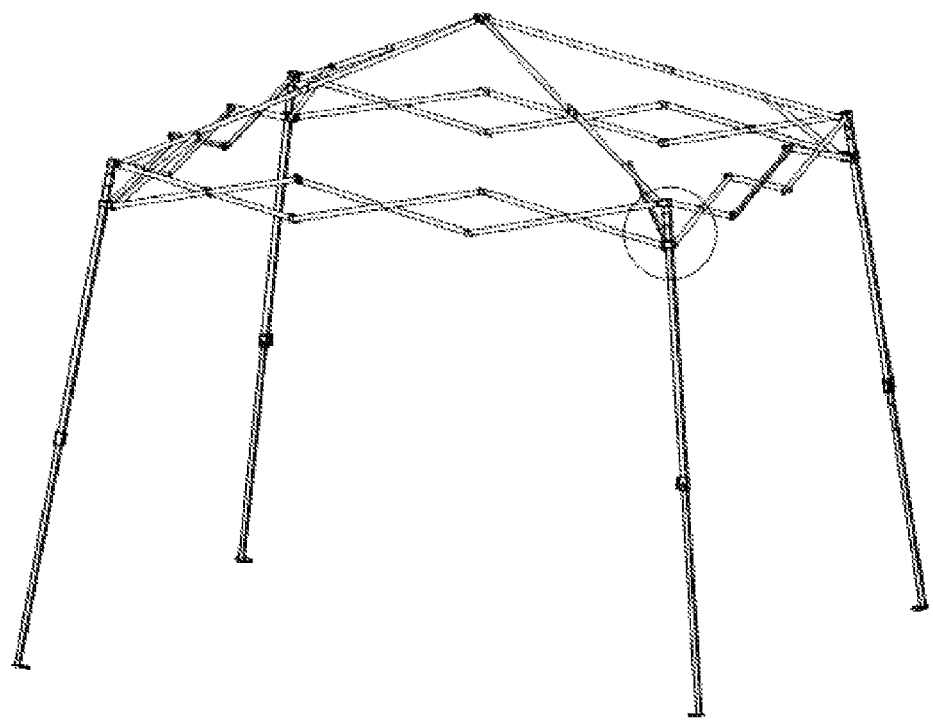
FIG. 1 is a schematic diagram of an overall structure of the folding tent.
Figure 2:
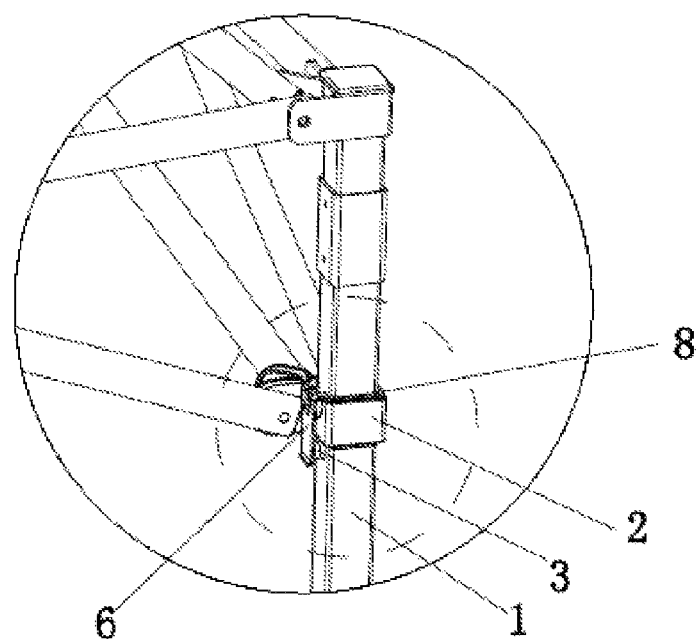
FIG. 2 is a partial enlarged view of FIG. 1.
Figure 3:
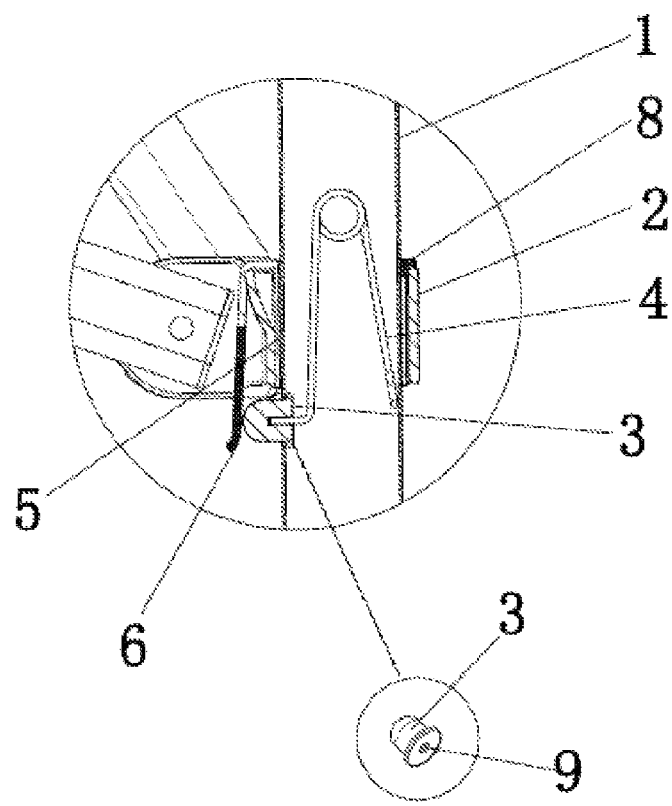
FIG. 3 is a broken-out section view of FIG. 2.
Figure 4:
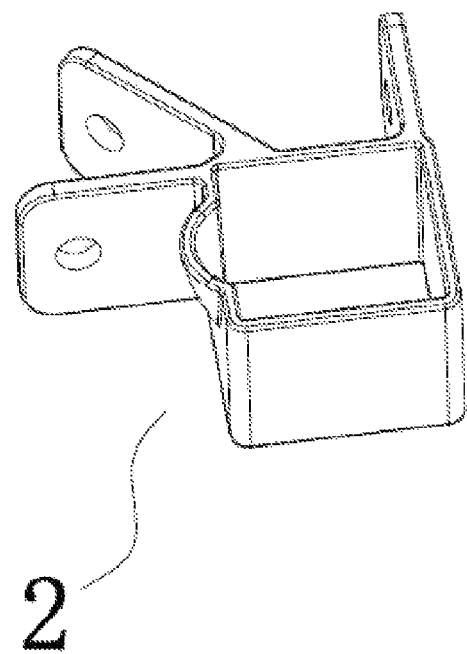
FIG. 4 is a structural view of the sliding support.
Figure 5:
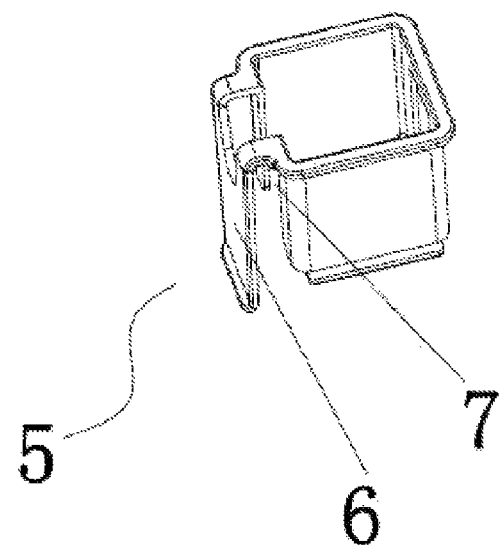
FIG. 5 is a structural view of the bushing.
Figure 6:
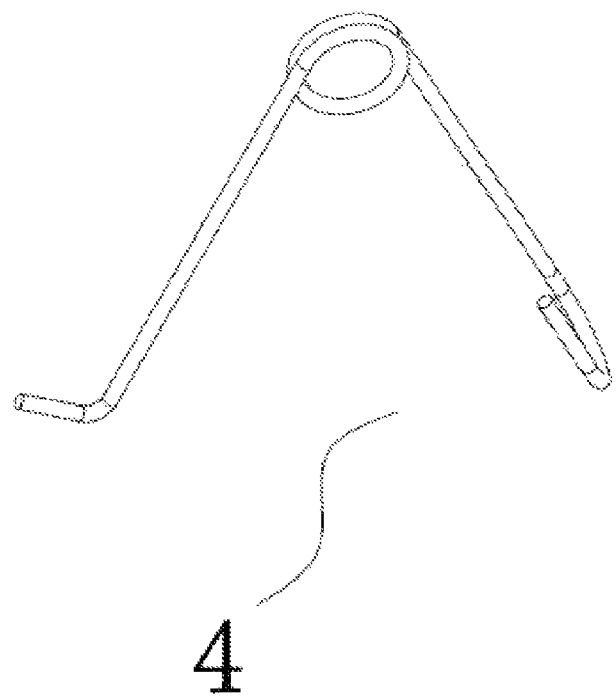
FIG. 6 is a structural view of the V-shaped spring in embodiment 1.

Disclosed is a leg tube sliding locking mechanism for opening and closing a folding tent, and the overall structure of the folding tent is shown in FIG. 1. The sliding locking mechanism is installed on a leg tube 1 of the folding tent, and the specific structure of the sliding locking mechanism is shown in FIGS. 2-6. The sliding locking mechanism includes a sliding support 2 sleeved on the leg tube 1, a jump bead 3 and a V-shaped spring 4. One end of the V-shaped spring 4 is connected to the jump bead 3, and the other end of the V-shaped spring 4 is fixed to an inner wall of the leg tube 1. A bushing 5 is further installed on an inner wall of the sliding support 2 in a fitted manner, an upper end of the bushing 5 extends downwards to form a pressing sheet 6, and the pressing sheet 6 has a lower end extending outwards to a lower end of the sliding support 2 to cover the jump bead 3. The jump bead 3 is provided with an installing hole, one end of the V-shaped spring 4 is inserted in the installing hole, a spring body of the V-shaped spring 4 is cylindrical, and the cross section thereof is round.

Furthermore, the bushing 5 is made of a plastic material and is correspondingly provided with a notch 7 parallel to the pressing sheet 6, the upper end of the bushing 5 is provided with an upper edge 8, and the upper edge 8 has a lower end abutting against an upper end of the sliding support 2.

Embodiment 2

Figure 7:
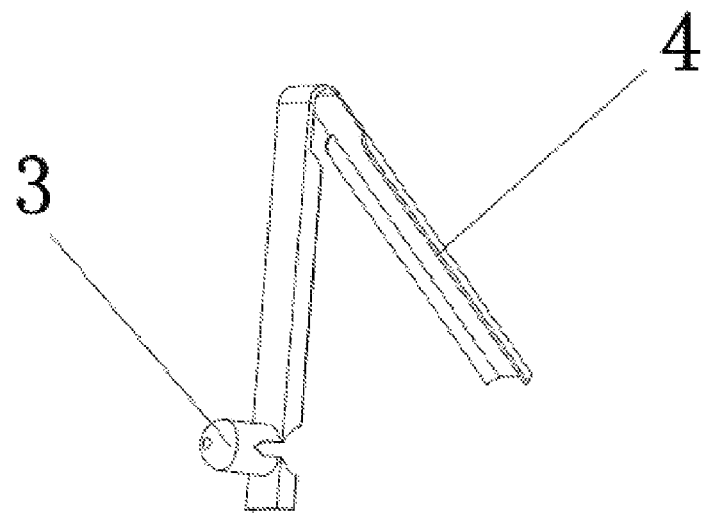
FIG. 7 is a structural view of the V-shaped spring in embodiment 2.
Figure 8:
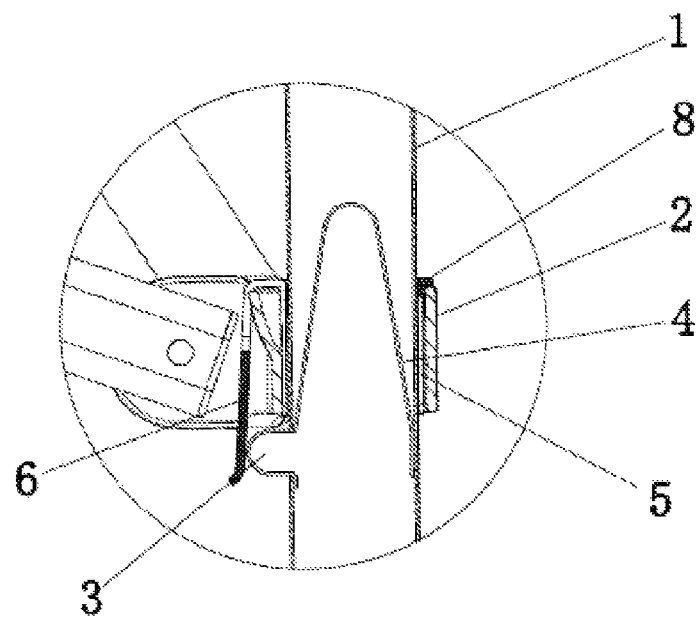
FIG. 8 is a section view after installation of the bushing in embodiment 2.

As shown in FIGS. 7-8, the structure of this embodiment is basically the same as that of embodiment 1, and the difference lies in the different specific structure of the V-shaped spring, wherein the V-shaped spring 4 in the embodiment and the jump bead 3 are of an integrated structure, and the spring body of the V-shaped spring 4 is of the plate-shaped structure.

When the folding tent is opened, the sliding support 2 drives the bushing 5 to move upwards, after a bottom portion of the sliding support 2 moves upwards to an upper portion of a position where the jump bead 3 is located, the jump bead 3 pops up and blocks the lower end of the sliding support 2 and abuts against the back of the elastic pressing sheet 6 of the bushing 5, and the tent is locked. When the folding tent is closed, all that is required is to press the pressing sheet 6, the jump bead 3 retracts to the inside of the leg tube 1, the sliding support 2 moves downwards, and the tent is closed. In the opening and closing processes, fingers are prevented from directly pressing the jump bead 3, and the hand clamping phenomenon is avoided.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A leg tube sliding locking mechanism for opening and closing a folding tent, the leg tube sliding locking mechanism comprising a sliding support sleeved on a leg tube, a jump bead and a V-shaped spring, one end of the V-shaped spring is connected to the jump bead, the other end of the V-shaped spring is fixed to an inner wall of the leg tube, a bushing is installed on an inner wall of the sliding support in a fitted manner, an upper end of the bushing extends downwards to form a pressing sheet, the pressing sheet has a lower end extending outwards to a lower end of the sliding support, and the pressing sheet covers the jump bead.

2. The leg tube sliding locking mechanism for opening and closing the folding tent according to claim 1, wherein the bushing is correspondingly provided with a notch parallel to the pressing sheet.

3. The leg tube sliding locking mechanism for opening and closing the folding tent according to claim 1, wherein the upper end of the bushing is provided with an upper edge, and the upper edge has a lower end abutting against an upper end of the sliding support.

4. The leg tube sliding locking mechanism for opening and closing the folding tent according to claim 1, wherein the jump bead is provided with an installing hole, and one end of the V-shaped spring is inserted in the installing hole.

5. The leg tube sliding locking mechanism for opening and closing the folding tent according to claim 4, wherein a cross section of the V-shaped spring is round.

6. The leg tube sliding locking mechanism for opening and closing the folding tent according to claim 1, wherein the jump bead and the V-shaped spring are integrally arranged.

7. The leg tube sliding locking mechanism for opening and closing the folding tent according to claim 1, wherein a spring body of the V-shaped spring is of a plate-shaped structure.

\* \* \* \* \*